March 21, 1950  C. W. HOPKINS  2,501,389
CENTERLESS METHOD OF THREAD GRINDING
Filed Oct. 7, 1949  2 Sheets-Sheet 1

Inventor
CECIL W. HOPKINS
By Strauch, Nolan & Diggins
Attorneys

March 21, 1950     C. W. HOPKINS     2,501,389
CENTERLESS METHOD OF THREAD GRINDING
Filed Oct. 7, 1949     2 Sheets-Sheet 2

Inventor
CECIL W. HOPKINS
By Strauch, Nolan & Diggins
Attorneys

Patented Mar. 21, 1950

2,501,389

UNITED STATES PATENT OFFICE 2,501,389

CENTERLESS METHOD OF THREAD GRINDING

Cecil W. Hopkins, Waynesboro, Pa., assignor to Landis Machine Company, Waynesboro, Pa., a corporation of Pennsylvania Application October 7, 1949, Serial No. 120,083

5 Claims. (Cl. 51—288)

This invention relates to a method of forming helical surfaces, such as screw threads, on a work piece in a grinding machine of the centerless type which comprises a grinding wheel, a control wheel and a work rest upon which the work moves axially during the grinding operation.

The grinding of screw threads upon a work piece by means of a centerless grinding machine was first suggested by Arthur Harold Lloyd who, in his United States Patent No. 2,010,730, dated August 6, 1935, disclosed one embodiment of such a machine in which the grinding wheel, the control wheel and the work supporting blade or ledge are mounted and arranged relative to each other in predetermined relationship with respect to the helix angle of the screw thread to be ground so as to cause the progressive axial travel of the work piece between the grinding and control wheels as it is revolved against the serrated face of the grinding wheel.

The present application for Letters Patent is a continuation-in-part of my co-pending application Ser. No. 63,867, filed December 7, 1948, now abandoned, and has for an object and purpose the provision of certain improvements in the method of operation of the centerless thread grinding machines of the Lloyd patent whereby a screw thread may be formed with greater accuracy of helix angle, pitch diameter and thread contour and is adapted to the accurate grinding of complete threads in substantially cylindrical work pieces, and in work pieces with previously formed threads.

In the grinding machine art, until recently, it was the general consensus of opinion that screw threads could not be accurately ground on cylindrical stock in a centerless grinding machine. The greater productive capacity of grinding machines of this type has inspired various suggestions with a view to the application of the centerless grinding principle in the production of threaded rods or screws. One of these suggestions to reach the stage of commercial development is described on pages 46 to 59 inclusive of the April 1945 issue of "Screw Machine Engineering." This proposed method, however, possesses certain inherent defects, hereinafter pointed out, which limits its application and renders the product of its employment unacceptable to meet the exacting demands of modern industry for extreme accuracy and consistently uniform results.

Particularly, the method described in the "Screw Machine Engineering" article specifies that the angle of inclination of the axis of the control wheel relative to the axis of the work piece must be equal to the helix angle of the thread to be ground. It is further stated that this angle is critical. I have discovered that this statement is in error and that helix angle inclination of the axis of the control wheel introduces errors in thread form, side interference caused by excessive lateral pressure by the serrations on the grinding wheel, and errors in lead. These errors increase as the helix angle increases, and commercially, the production of reasonably accurate threads with control wheel inclined at the helix angle has been limited to threads of 12 pitch and finer in a single pass.

As pointed out hereinafter and as first disclosed in my copending application Serial No. 600,147, filed June 18, 1945, which matured as Patent No. 2,495,329, dated January 24, 1950, I have discovered that the correct critical angle for this inclination is equal to the angle made by the helix of the thread to be formed at the outside or major diameter of the work piece with a plane perpendicular to the axis of the workpiece and may be advantageously employed with the method of application Serial No. 63,867, now abandoned, to obtain maximum accuracy of thread form with prolonged useful life of the grinding wheel. By use of this latter angle, new in the art, I consistently produce threads of precision and gauge accuracy in coarse as well as fine pitches, results not heretofore secured.

The grinding wheel and control wheel have heretofore been rotated in the same direction so that the surface of the grinding wheel adjacent the work piece moves downwardly while the surface of the control wheel adjacent the work piece moves upwardly. Thus the effect of the control wheel is to slow down and regulate the rotative speed of the work piece, which speed is induced by the more rapidly moving grinding wheel. The rotation of the work piece, of course, is in the direction opposite that of both the grinding and the control wheel. The relative inclination of the control wheel and work piece helps to induce the axial movement of the latter necessary for the generation of helical screw threads and is assisted therein by the relative inclination between work piece and grinding wheel.

In combination with the proper relative inclination between the axes of wheels and work piece, this prior method within certain limitations will yield quite satisfactory commercial results. However, I have discovered that under these conditions, the control wheel urges the work piece upwardly toward the wider part of the grinding throat with a force that is proportional to the depth of "cut" being taken upon the work piece. If, as sometimes occurs, the work piece is lifted off the work rest blade, effective contact between work piece and wheels is lost, the steady endwise feed of the former is interrupted and the screw thread is damaged. Such lifting was not objectionable in grinding plain cylindrical surfaces by this method because in that case the axial movement did not need to be precise as it does in thread grinding and if such axial movement were interrupted, it could be resumed at any time without regard to the rotative position of the cylindrical work piece. In thread grinding, there is also the imminent danger that, when a work piece is lifted off the work rest blade, it slips relative to the control wheel and obtains an uncontrolled rotative speed from the grinding wheel, which speed is very great and causes the work piece to screw itself out of the grinding throat with extreme rapidity and momentum, to the possible injury of the machine operator.

Heretofore it has been deemed necessary in the centerless grinding of threads to rotate the regulating or control and grinding wheels in the same direction, and to rely upon the joint frictional action of the grinding and regulating wheels to feed the work piece at the proper rate through the grinding throat.

In such prior grinding operations the adjacent surfaces of grinding wheel and work piece move in the same direction and grinding stresses are high because of a so-called "climb-cut" operation in which the full force required to remove a single chip is applied first and progressively decreases as the removal of the chip is accomplished. The life of the serrations and of the costly grinding wheel is accordingly relatively short.

I have discovered that it is possible to eliminate the grinding wheel as a factor in the rotation and endwise movement of the work piece and to maintain at all times firm contact between work, work rest, control wheel and grinding wheel to produce more accurate and uniform work, and also to grind coarser threads with a heavier "cut." In applying my discovery I have invented a method of grinding screw threads on a centerless grinding machine, in which the grinding and control wheels are caused to rotate in opposite directions so that the peripheral surfaces of both wheels adjacent to the work piece move downwardly. In this way the work piece takes its rotation solely from the control wheel and the periphery of the work moves counter to the operating surface of the grinding wheel. I have found this effectively prevents lifting of the work piece and establishes firm contact between the work piece and the work rest blade and between the work piece and the control wheel, since the grinding wheel also tends to force the work piece downward toward the control wheel, and unexpectedly, the result is a product that is more accurate as to form and thread lead.

The grinding stresses are also minimized due to the fact that the chips are removed gradually with an initial minimum and gradually increasing bite of the wheel serrations into the work piece. The elimination of this destructive shock load on the grinding wheel by my present invention and discovery is a particularly important advantage in thread grinding where the prolonged maintenance of an accurate, well defined grinding wheel profile is highly important.

A primary object of my present invention is to provide an improved method of centerless grinding of threads with precision not heretofore attainable.

A further object is the provision of a novel method of centerless thread grinding whereby the tendency of the workpiece to rise from the work rest, and the production of dangerous and destructive spinners is eliminated.

Another object of my invention is to provide a novel method of thread grinding in which the shock and operational stresses on the grinding wheel are minimized and the useful life of the serrations and of the grinding wheel is substantially prolonged, with resultant reduction of costs and increase of production.

Further objects and advantages of my invention will be apparent from the following complete description thereof and from the accompanying drawing, in which Figure 1 is a diagrammatic representation of the chief operative members of a centerless thread grinding machine operating in accordance with one embodiment of my invention, seen in front elevation.

Figure 1:
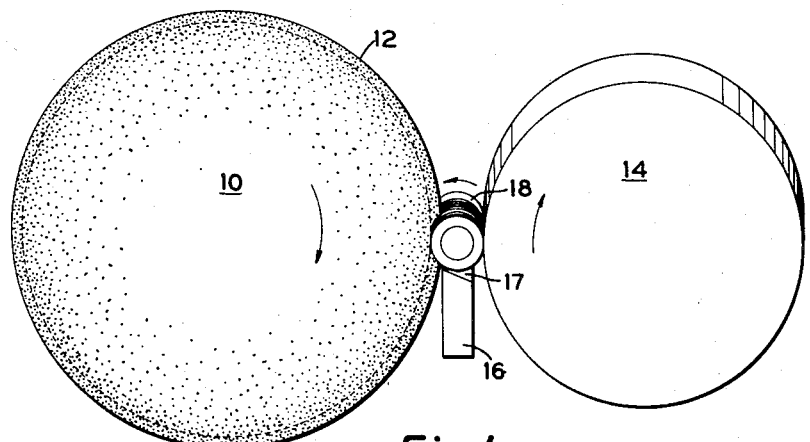

The centerless thread grinding machine represented in the drawings comprises a grinding wheel 10 having a series of annular ribs or serrations 12 and grooves 12 formed on its periphery, and a control wheel 14 having a smooth surface of revolution, specifically hyperboloidal. The grinding wheel 10 is usually mounted for rotation with its axis immovably located in a horizontal plane. The control wheel 14 is rotatably mounted, usually with its axis in a vertical plane parallel to the vertical plane passing through the grinding wheel axis, although the control wheel may be mounted so that its axis can be pivotally moved horizontally to produce or correct a slight taper in the work piece. The control wheel axis is also adjustably inclinable vertically relative to the horizontal plane containing the grinding wheel axis all in a manner well known.

A work rest blade 16 having a work supporting surface 17 (which for grinding cylindrical blanks is smooth, and for grinding work pieces having preformed threads may be serrated to locate the thread) may be adjustably mounted with respect to the grinding wheel axis as shown and described in my prior Patent No. 2,417,413, issued March 18, 1947, and is located in the grinding throat between grinding wheel 10 and control wheel 14 for the support of a workpiece 18. Work rest blade 16 is adjusted so that its surface 17 is inclined relative to the axis of grinding wheel 10 at an angle equal to the helix angle of the thread to be ground, as taught by the United States patent to Lloyd, No. 2,010,730, issued August 6, 1935. Because of this relative inclination between workpiece 18 and grinding wheel 10, the profile of the thread forming ribs and grooves, as seen along a cylindrical element of grinding wheel 10 or in a plane passing through the axis thereof, cannot be precisely the inverted duplicate of the thread profile which will be produced by it along a cylindrical element of the workpiece. Hence the profile as applied to the grinding wheel 10 should theoretically be modified to produce the proper thread form on the work piece. In practice, however, it is found that the difference is negligible for ordinary work and that modification in the grinding wheel profile need be made only when the helix angle is extraordinarily high. The distance between the crests of the ribs on the grinding wheel must, however, be made smaller than the linear pitch of the thread to be produced, by making the said distance equal to the linear pitch of the thread times the cosine of the helix angle of the thread, in accordance with well-known principles of thread grinding.

Two methods of presenting the work piece to the grinding wheel are commonly employed in centerless grinding. In one method, known as infeed grinding, the control wheel 14 is retracted laterally to widen the grinding throat and permit the work piece to be inserted between the wheels by hand or mechanical means. The control wheel is then advanced toward the grinding wheel and the grinding operation proceeds until the advance of the control wheel is stopped at the point necessary to cause formation of the desired diameter of the work piece. At this point, in centerless thread grinding, the grinding throat has a minimum width. Upon the retraction of the control wheel, the finished work piece may be removed from between the wheels and another substituted.

In the other method, known as through-feed grinding, the relative operative positions are maintained so that the proper width of the throat between the wheels is such as to produce the desired diameter of the work piece. In this method, the work piece is inserted at one end of the throat and travels axially until it is ejected at the opposite end. In through feed grinding, it is desirable to bevel several ribs at the entrance side of the grinding wheel as indicated at 20 in the drawings. This bevel 20 has the purpose of gradually forming the threads as the work piece is moved axially through the throat. A cylindrical grinding surface 22 is also desirable to grind the peripheral surface of the work piece accurately to size before it is engaged by the beveled ribs 20.

In prior plain through feed centerless grinding the rate of axial travel of the work piece may be set arbitrarily and is dependent upon such factors as degree of finish desired, amount of rounding or straightening action necessary, etc. In plain infeed grinding, no axial travel of the work piece is necessary or usually desirable. In both through and infeed centerless thread grinding, however, the rate of axial travel of the work piece determines the lead of the thread being ground, and for threads of given pitch must be the same regardless of which method is employed to present the work piece to the grinding wheel.

Figure 2:
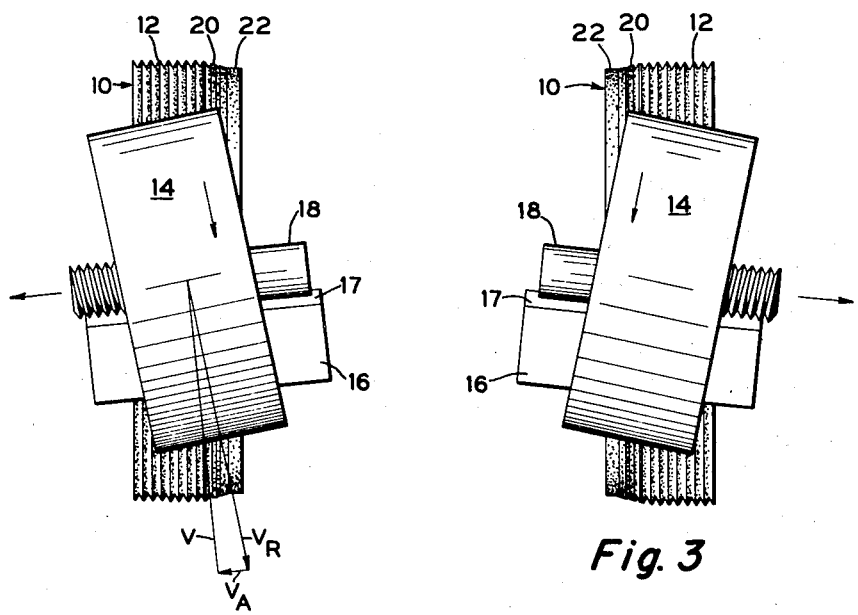
Figure 2 is a diagrammatic representation of the same parts as shown in Fig. 1 but seen in side elevation.
Figure 3:
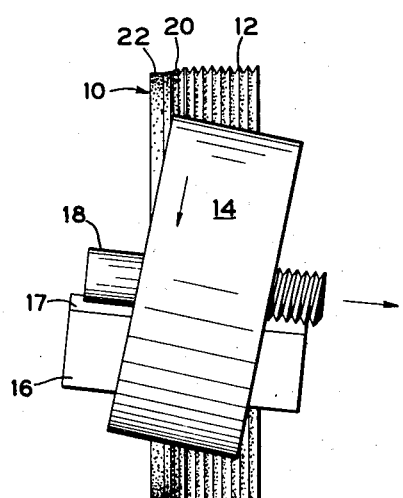
Figure 3 is a view similar to Fig. 2 but with the parts arranged for grinding a left hand thread.

In the prior centerless thread grinding methods and in the embodiments of Figures 1 to 3 inclusive, the grinding and control wheels rotate in the same direction, and such axial movement of the work piece is achieved by inclination of the wheel axes relative to the axis of the work piece and the joint frictional action of the grinding and control wheels on the work piece. Using the axis of the work piece as a datum, the inclinations of the axes of grinding wheel 10 and control wheel 14 are opposite. It is possible, therefore, to maintain the axis of the grinding wheel 10 in a horizontal position, incline the axis of the work piece 18 to substantially the helix angle and incline the control wheel axis further in the same direction. The resultant axial travel of the work piece is influenced by the amount of inclination of the control wheel relative to the axis of the work. It should be noted that these directions of inclination are only relative and that it is not necessary that the grinding wheel axis be located in a horizontal plane. And as hereinbefore stated, in the prior centerless thread grinding methods the helix angle relationship of the grinding and regulating wheels to the axis of the work piece has been considered essential.

The proper amount of inclination between work piece and control wheel in accordance with my discovery is illustrated by the vector diagram in Figure 2 in which the vector $V_R$ represents the distance traveled by a point on the control wheel in one revolution thereof. The value of $V_R$ therefore, may be expressed as $\pi D$, where D is equal to the diameter of the control wheel. The vector $V_A$ represents the axial movement of the work piece in one revolution of the control wheel and is parallel to the axis of the work piece, making a right angle with the vector $V$ drawn perpendicular to the work piece axis. Now, $V_A = V_R \sin \alpha$ where $\alpha$ is the angle between $V$ and $V_R$, or, in other words, the amount of relative inclination between the work piece and control wheel axes. Since $V_R = \pi D$, then $V_A = \pi D \sin \alpha$.

The velocity ratio between control wheel and work piece is equal to $$\frac{D}{\frac{d}{\cos \alpha}} \text{ or } \frac{D \cos \alpha}{d}$$

where $d$ is the external diameter of the work piece. Therefore, the axial movement of the work piece in one revolution thereof ($Va$) is equal to $$\frac{V_A}{\frac{D \cos \alpha}{d}} \text{ or } \frac{d V_A}{D \cos \alpha}$$

Then, since $V_A = \pi D \sin \alpha$ $$Va = \frac{d \pi D \sin \alpha}{D \cos \alpha} = \frac{\pi d \sin \alpha}{\cos \alpha} = \pi d \tan \alpha$$

Therefore in accordance with my discovery, the angle of inclination of the control wheel axis relative to the work piece axis for maximum accuracy of grinding, is equal to the angle made by the helix of the thread to be formed, at the external diameter of the work piece with a plane perpendicular to the axis of the work piece. This angle is always less than the helix angle of the thread. This is preferable in all embodiments of my invention.

The theoretic error introduced by use of the helix angle inclination of the control wheel and work piece axes as compared to the results procured by the angle of my invention is illustrated in the following tabulations:

| Nominal diam. of thread (in.) | Threads per inch | Lead | Mean major diameter | Mean pitch diameter |
|---|---|---|---|---|
| | | Inches | Inches | Inches |
| ¼ | 20 | .050 | .2454 | .2152 |
| ⅜ | 16 | .0625 | .3692 | .3315 |
| ½ | 13 | .0769 | .4933 | .4466 |
| ⅝ | 11 | .0909 | .6174 | .5622 |
| ¾ | 10 | .1000 | .7417 | .6808 |
| ⅞ | 9 | .1111 | .8659 | .7962 |
| 1 | 8 | .1250 | .9902 | .9139 |

| Nominal diam. of thread (in.) | Helix Angle | Angle of Invention | Angle error | Lead error per thread | Lead error per inch |
|---|---|---|---|---|---|
| | | | | Inches | Inches |
| ¼ | 4° 13′ 48″ | 3° 42′ 39″ | 31′ 9″ | .0070 | .1404 |
| ⅜ | 3° 26′ 4″ | 3° 5′ 4″ | 21′ 0″ | .0068 | .1114 |
| ½ | 3° 8′ 16″ | 2° 50′ 30″ | 17′ 46″ | .0081 | .1044 |
| ⅝ | 2° 56′ 47″ | 2° 41′ 0″ | 15′ 47″ | .0089 | .0962 |
| ¾ | 2° 40′ 36″ | 2° 27′ 27″ | 13′ 9″ | .0089 | .0893 |
| ⅞ | 2° 32′ 13″ | 2° 20′ 20″ | 11′ 53″ | .0094 | .0848 |
| 1 | 2° 29′ 35″ | 2° 18′ 4″ | 11′ 31″ | .0105 | .0836 |

These errors are far beyond those permitted by even the most liberal screw thread standards and are always positive, that is, the resultant lead of the thread is too long, since the screw advances faster when the control wheel is inclined at the larger angle (the helix angle). These theoretic tabulated errors are modified in practice by reason of the fact that the correctly spaced serrations on the grinding wheel tend to correct these errors during the grinding operation. While a partial lead correction thus results in the prior grinding practice, excessive lateral pressures are caused against the grinding wheel serrations by one flank of the thread on the work piece, which results in side shaved threads and sometimes in fractured grinding wheel ribs. This partial correction decreases as the helix angle and depth of thread increase.

Figure 5:
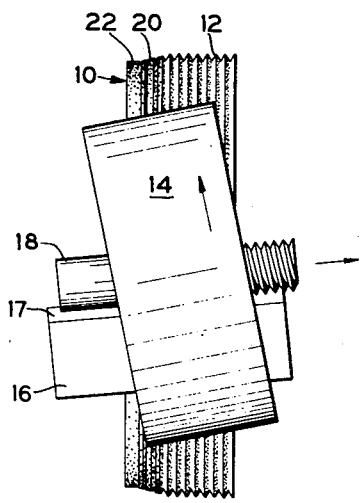
Figure 5 is a side elevation of the same parts shown in Figure 4.

In the embodiment of my invention shown in Figures 1 to 3 the control wheel 14 is rotated in the same direction as the grinding wheel 10 with the peripheral surface of the control wheel 14 moving upwardly where it contacts the work piece 18 and the periphery of grinding wheel 10 moving downwardly past the work piece 18, as shown by the arrows in Figure 5. Under these conditions, the work piece 18 receives its rotative speed from the grinding wheel 10, which operates at a much higher peripheral speed than the control wheel 14. The rotative speed of work piece 18 is slowed and controlled by the control wheel 14 due to the frictional contact thereof with the work piece. As the grinding operation proceeds, the resultant axial travel of the work piece is to the left, in the direction of the arrow as shown in Figure 2.

Figure 3 shows the same procedure being employed to generate a left hand thread. It will be evident that, since the grooves of the grinding wheel 10 are inclined relative to the axis of the work piece 18 at the helix angle thereof, this relative inclination will be, in the case of a left hand thread, opposite to that for a right hand thread as shown in Figure 2. Also the same direction of rotation of the wheels as shown in Figure 3, results in the axial movement of the work to the right, in the direction of the arrow.

It will be noted that, in this method, by virtue of the fact that both control wheel 14 and grinding wheel 10 rotate in the same direction while the work 18 rotates in the opposite direction, both wheels assist that rotation of the workpiece and consequently its axial movement.

Under normal conditions and particularly for relatively fine thread, the method of Figures 1 to 3 has proved satisfactory. However, in the case of coarse threads or where much metal must be removed, or under conditions which promote slippage between work piece and control wheel errors are introduced which are eliminated in the embodiments of my invention illustrated in Figures 4 to 6.

Figure 4:
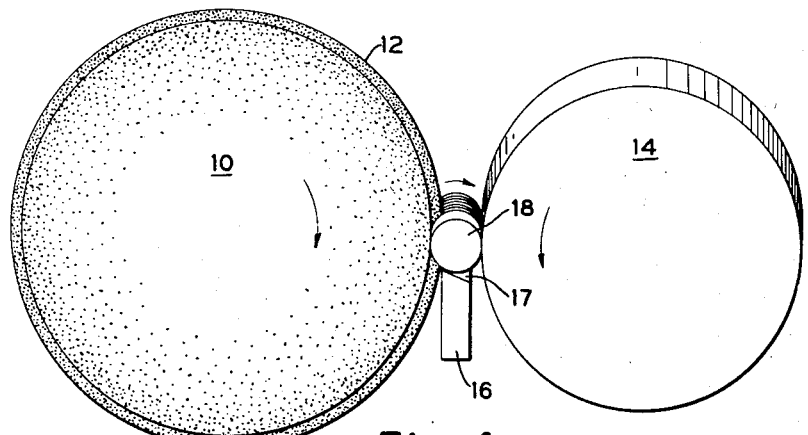
Figure 4 is a view similar to Fig. 1 but with the parts arranged to operate by a further modification of my invention.

According to this embodiment of my invention, I rotate the control wheel in the direction shown by the arrow in Figure 4, i. e. counterclockwise, opposite to the direction of rotation of the grinding wheel 10 and with its periphery moving downwardly adjacent the work piece. Under these conditions the work piece 18 takes the direction of its rotation from the control wheel alone and revolves in the clockwise direction as seen in Fig. 4. It will be noted that the grinding wheel periphery is also moving in the clockwise direction but in the opposite direction from the direction of movement of the adjacent work periphery, or counter to it with respect to the work piece axis. It will also be observed that the work piece is now firmly held down on the work rest blade by the combined influence of the grinding and control wheels and is forced downwardly against the control wheel surface by the grinding wheel and the inclination of surface 17 of the work rest 16 toward the surface of the regulating wheel 14. This inclination of the surface 17 is a factor in the frictional pressure of the work piece 18 against the regulating or control wheel 14 and may be varied in accordance with operating conditions and the type of material being ground. The inclination between axes of the grinding wheel and work is such that the grinding wheel rotation tends to force the work piece axially to the left or in down-hill direction as seen in Figure 5, while the relative inclination and rotation of control wheel and work is such that this influence is nullified and the work piece is actually forced to the right as seen in Figure 5, upwardly along the inclined surface 17 of work rest blade 16 and opposite to the tendency induced by the grinding wheel. The grinding wheel does not control the rotation or axial movement of the work piece, these movements being effected solely by the control wheel and in opposition to the forces exerted by the grinding wheel. This arrangement obviates the tendency of the work piece shown in Figures 1 to 3, to rise causing loss of frictional contact between work piece and control wheel so that the work piece is rotated by the grinding wheel alone, resulting in dangerous spinners.

Figure 6:
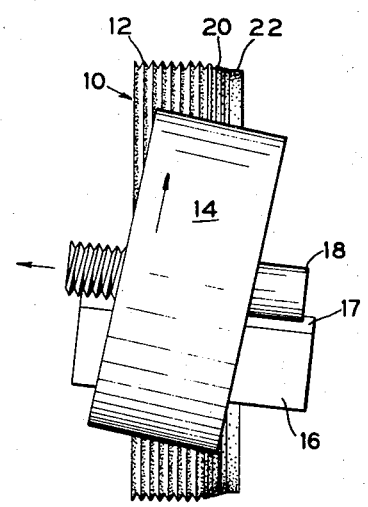
Figure 6 is also a side elevation of the parts shown in Figure 4 but arranged for grinding a left hand thread.

As shown in Figure 6, left hand threads may be ground by the use of the same basic arrangement and relative rotation of wheels and work by inclining both work rest blade surface 17 and control wheel 14 relative to the axis of grinding wheel 10 at the same angles as for right hand threads, but in the opposite direction from the datum plane containing the axis of grinding wheel 10.

To obtain maximum accuracy of thread form the angle of the control wheel with respect to the workpiece axis is the same as above described in connection with Figures 1 to 3 of the drawings. However, screws or rods intended for certain uses may not require such high precision of thread form, in which case the control wheel may be set at the required work feed controlling angle to produce the desired helical surface on the workpiece which may contain certain minor imperfections.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of generating a helically contoured surface on a substantially cylindrical workpiece in a centerless grinding machine having a grinding wheel with a contoured profile thereon, a control wheel peripherally opposed to said grinding wheel and spaced therefrom to form a grinding throat and a smooth surface work rest for supporting a workpiece for movement between the opposed portions of said wheels; which consists in arranging the axes of said wheels in substantially parallel planes and with the control wheel axis vertically inclined with respect to said work rest surface at the required work feed controlling angle to produce the desired helical surface on the workpiece, supporting a cylindrical workpiece on the work rest with its axis substantially parallel with the smooth surface thereof, and rotating said wheels in relatively opposite directions with the peripheral surfaces thereof moving downwardly from the workpiece to rotate the workpiece in the same direction as the grinding wheel solely by the driving and controlling effect of the control wheel and simultaneously moving the workpiece endwise in the grinding throat in predetermined timed relation with the rotation, solely by the action of the control wheel operating through its frictional contact with the workpiece, while maintaining constant axial parallelism between the workpiece and the work rest surface.

2. The method of generating a helically contoured surface on a substantially cylindrical workpiece as defined in claim 1, wherein the work rest surface is also inclined at an angle relative to the axis of the grinding wheel and in the same direction as the direction of inclination of the control wheel axis with respect to said work rest surface.

3. The method of generating screw threads of a predetermined helix angle on a substantially cylindrical workpiece in a centerless grinding machine having a grinding wheel with annular ridges thereon, a control wheel peripherally opposed to said grinding wheel and spaced therefrom to form a grinding throat and a smooth surface work rest for supporting the workpiece for movement between the opposed portions of said wheels; which consists in arranging the axes of said wheels in substantially parallel planes and inclined in opposite directions with respect to said work rest surface at an angle thereto such as to generate a thread of the desired helix angle, and with the peripheral faces of said wheels spaced from each other to provide a grinding throat having a minimum width measured from the bottom of the grinding wheel grooves to the surface of the control wheel substantially equal to the diameter of the workpiece, supporting a cylindrical workpiece on the work rest with its axis substantially parallel with the smooth surface thereof, and rotating said wheels in relatively opposite directions with the peripheral surfaces thereof moving downwardly from the workpiece to rotate the workpiece in the same direction as the grinding wheel solely by the driving and controlling effect of the control wheel and simultaneously moving the workpiece endwise in the grinding throat in predetermined timed relation with the rotation, solely by the action of the control wheel operating through its frictional contact with the workpiece, while maintaining constant axial parallelism between the workpiece and the work rest surface.

4. The method of generating screw threads of a predetermined helix angle on a substantially cylindrical workpiece as defined in claim 3, wherein the grinding wheel axis is substantially horizontal and the work rest surface is inclined at an angle relative to the axis of the grinding wheel and in the same direction as the direction of inclination of the control wheel axis with respect to said work rest surface.

5. The method of generating a screw thread of predetermined lead with maximum accuracy on a workpiece in a centerless grinding machine having a grinding wheel with annular ridges thereon, a control wheel peripherally opposed to said grinding wheel and spaced therefrom to form a grinding throat, and a work rest for supporting a work piece between the wheels having a supporting surface inclined downwardly toward the control wheel; which comprises the steps of arranging the axes of said wheels in substantially parallel planes with the axis of the control wheel vertically inclined with respect to said work rest surface at an angle thereto substantially equal to the angle made by the helix of the thread at the outer diameter of the workpiece with a plane perpendicular to the axis of the workpiece, supporting a workpiece on the work rest with its axis substantially parallel with the supporting surface thereof, and rotating said wheels in relatively opposite directions with the peripheral surfaces thereof moving downwardly from the workpiece to rotate the workpiece in the same direction as the grinding wheel solely by the driving and controlling effect of the control wheel and simultaneously moving the workpiece endwise in the grinding throat in predetermined timed relation with the rotation, solely by the action of the control wheel operating through its frictional contact with the workpiece, while maintaining constant axial parallelism between the workpiece and the work rest surface.

CECIL W. HOPKINS.

REFERENCES CITED

The following references are of record in the file of this patent:

UNITED STATES PATENTS

| Number | Name | Date |
| --- | --- | --- |
| 2,116,031 | Lindner | May 3, 1938 |

OTHER REFERENCES

"Centerless Thread Grinding," Landis Tool Co. reprint of Screw Machine Engineering, April 1945.